United States Patent
Rew et al.

(10) Patent No.: US 8,676,380 B2
(45) Date of Patent: Mar. 18, 2014

(54) MOVING ROBOT AND OPERATING METHOD FOR SAME

(75) Inventors: Ho Seon Rew, Seoul (KR); Jeong Suk Yoon, Seoul (KR); Young Gyu Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 654 days.

(21) Appl. No.: 12/594,451

(22) PCT Filed: Apr. 3, 2008

(86) PCT No.: PCT/KR2008/001894
§ 371 (c)(1),
(2), (4) Date: Jun. 25, 2010

(87) PCT Pub. No.: WO2008/120961
PCT Pub. Date: Oct. 9, 2008

(65) Prior Publication Data
US 2010/0268385 A1    Oct. 21, 2010

(30) Foreign Application Priority Data

Apr. 3, 2007    (KR) .................. 10-2007-0032827

(51) Int. Cl.
*G05B 19/04* (2006.01)
*G06F 19/00* (2011.01)

(52) U.S. Cl.
USPC ............. 700/259; 700/1; 700/245; 700/263

(58) Field of Classification Search
USPC ............ 700/1, 245, 263; 355/132, 20, 28, 39, 355/46, 64, 79; 396/180, 252, 316, 317, 396/332, 354
See application file for complete search history.

(56) References Cited

U.S. PATENT DOCUMENTS

| | | | | |
|---|---|---|---|---|
| 7,031,805 | B2* | 4/2006 | Lee et al. | 700/245 |
| 7,801,645 | B2* | 9/2010 | Taylor et al. | 700/258 |
| 8,417,383 | B2* | 4/2013 | Ozick et al. | 700/258 |
| 2002/0016649 | A1* | 2/2002 | Jones | 700/245 |
| 2003/0120389 | A1* | 6/2003 | Abramson et al. | 700/245 |
| 2004/0020000 | A1* | 2/2004 | Jones | 15/319 |
| 2004/0088080 | A1* | 5/2004 | Song et al. | 700/259 |
| 2004/0158357 | A1* | 8/2004 | Lee et al. | 700/258 |

(Continued)

FOREIGN PATENT DOCUMENTS

| | | |
|---|---|---|
| EP | 1 517 210 A2 | 3/2005 |
| GB | 2 394 797 A | 5/2004 |

(Continued)

OTHER PUBLICATIONS

International Search Report dated Oct. 1, 2008.

(Continued)

*Primary Examiner* — Ian Jen
(74) *Attorney, Agent, or Firm* — KED & Associates, LLP

(57) ABSTRACT

There are provided a moving robot and a method of operating the same. A bottom surface is photographed to sense a moving distance and a moving direction based on input image data. The amount of light radiated to photograph the bottom surface is sensed to feedback control the light emission degree of a light source unit. The light source unit is controlled when errors are generated in sensing the image data. Therefore, the sensing ratio of the photographed image is improved so that correctness of calculating the position of the moving robot is improved.

10 Claims, 9 Drawing Sheets

(56) References Cited

U.S. PATENT DOCUMENTS

| | | |
|---|---|---|
| 2004/0204792 A1* | 10/2004 | Taylor et al. .................. 700/245 |
| 2004/0210343 A1 | 10/2004 | Kim et al. .................... 700/245 |
| 2004/0211444 A1* | 10/2004 | Taylor et al. ................... 134/18 |
| 2004/0236468 A1* | 11/2004 | Taylor et al. .................. 700/245 |
| 2005/0000543 A1* | 1/2005 | Taylor et al. ................... 134/18 |
| 2005/0010331 A1* | 1/2005 | Taylor et al. .................. 700/245 |
| 2005/0213082 A1* | 9/2005 | DiBernardo et al. .... 356/139.03 |
| 2005/0251292 A1* | 11/2005 | Casey et al. .................. 700/245 |
| 2005/0273967 A1* | 12/2005 | Taylor et al. ................... 15/319 |
| 2006/0020369 A1* | 1/2006 | Taylor et al. .................. 700/245 |
| 2006/0083427 A1 | 4/2006 | Jung et al. .................... 382/201 |
| 2006/0241812 A1* | 10/2006 | Jung ............................. 700/254 |
| 2007/0061040 A1* | 3/2007 | Augenbraun et al. ........ 700/245 |
| 2007/0061043 A1* | 3/2007 | Ermakov et al. .............. 700/263 |
| 2012/0222224 A1* | 9/2012 | Yoon et al. ..................... 15/52.1 |

FOREIGN PATENT DOCUMENTS

| | | |
|---|---|---|
| JP | 2000-163124 | 6/2000 |
| JP | 2002-085305 | 3/2002 |
| KR | 10-2004-0086940 | 10/2002 |
| KR | 10-2006-0033497 | 4/2006 |

OTHER PUBLICATIONS

European Search Report dated Nov. 29, 2010 issued in Application No. 08 74 1144.

* cited by examiner (a)

(b)

(a)

(b)

(a)

(b)

MOVING ROBOT AND OPERATING METHOD FOR SAME

TECHNICAL FIELD

The present invention relates to a moving robot and a method of operating the same, and more particularly, to a moving robot capable of receiving the image of a bottom surface to calculate a moving distance during movement and to sense the position of the moving robot and a method of operating the same.

BACKGROUND ART

Recently, robots that have been used for industry are developed for housework to be used for common houses. The field of the housework robots is increasing.

The representative example of the housework robots is a cleaning robot. The cleaning robot that is a moving robot used for housework travels by itself in a uniform region and suctions dust or foreign substances in the vicinity to clean the corresponding region.

The moving robot travels in the uniform region to suction the dust and foreign substances. A chargeable battery is provided so that the moving robot can freely move and can move by itself using the operating power source of the battery. A plurality of sensors for avoiding an obstacle during traveling are provided so that the moving robot can travel while avoiding the obstacle.

The moving robot cannot sense the position thereof in accordance with image data obtained by photographing a bottom surface when the moving robot moves in a place where the bottom surface is not even as illustrated in FIG. 1A and when the moving robot is caught by the obstacle to be lifted by uniform height as illustrated in FIG. 1B. At this time, since noise is included in or a distorted signal is input to the image data on the bottom surface as illustrated in FIG. 1C, when the bottom surface is not even, it is not possible to sense the position of the moving robot in accordance with the image data.

Recently, robots are used for an entire industry and are developed for the housework so that the robots can be used for the common houses. Robots that can perform the housework as well as the industrial robots are developed to be used. The field of the housework robots is increasing.

The moving robot that photographs the bottom surface to determine the position thereof must radiate light onto the bottom surface. The image of the photographed bottom surface may not be uniform in accordance with the material or characteristics of the bottom surface. In addition, since the state of the photographed image is not uniform in accordance with the state of the bottom surface or weather, it is difficult to sense the photographed image so that the correctness of calculating the position of the moving robot using the image is low.

DISCLOSURE OF INVENTION

Technical Problem

In order to solve the above-described problems, it is an object of the present invention to provide a moving robot capable of calculating a moving distance through the image of a bottom surface that is input during the movement of the moving robot, of controlling a light source when errors are generated in input data, and of feedback controlling the emission amount of the light source so that the state of the photographed image is uniform to prevent errors from being generated in sensing the image and to improve the correctness of sensing the moving distance of the moving distance and the position of the moving robot in accordance with the moving distance and a method of operating the same.

Technical Solution

In order to achieve the above object, there is provided a moving robot, comprising a photographing unit for photographing an image using incident light, at least one light source unit for radiating light onto a region photographed by the photographing unit, and a controller for controlling the light source unit when errors are generated in data input from the photographing unit.

There is provided a method of operating a moving robot, comprising comparing data photographed by a photographing unit in accordance with time to calculate a moving distance, controlling a light source for radiating light so that the photographing unit photographs the data when errors are generated in the photographed data, and comparing data re-input from the photographing unit to calculate the moving distance.

Advantageous Effects

According to the present invention, in the moving robot and the method of operating the same, the photographed data are compared with each other and analyzed to calculate the moving distance or the position of the moving robot. When errors are generated in the photographed data, the amount of light or the radiation angle of light is variably controlled and the amount of the light radiated for photographing is sensed to control the degree of light emission so that the amount of the light emission is reduced in a bright place and that the amount of the light emission is increased in a dark place. Therefore, since brightness of a proper amount for photographing the image can be maintained and the quality of the image obtained by photographing the bottom surface is maintained in a uniform level, the image is easily sensed to prevent noise from being generated due to the insufficient amount of light and to prevent errors from being generated in calculating the position of the moving robot due to errors in sensing the image. As a result, the correctness of calculating the moving distance and the position of the moving robot is improved.

BEST MODE FOR CARRYING OUT THE INVENTION

Hereinafter, embodiments of the present invention will be described with reference to the accompanying drawings.

Figure 2:
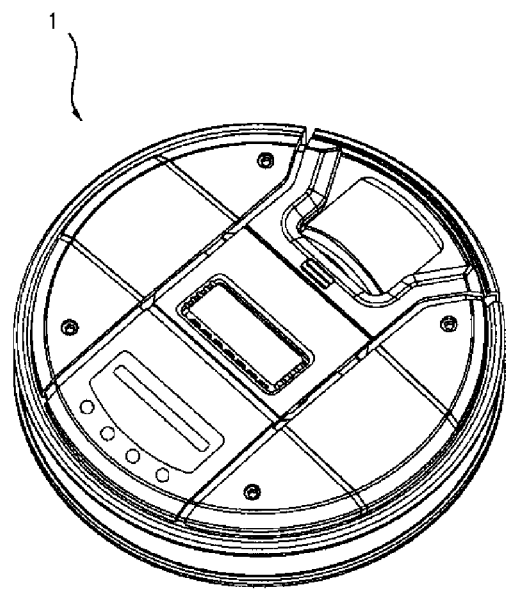
FIG. 2 is a perspective view illustrating a moving robot according to an embodiment of the present invention.
Figure 2:
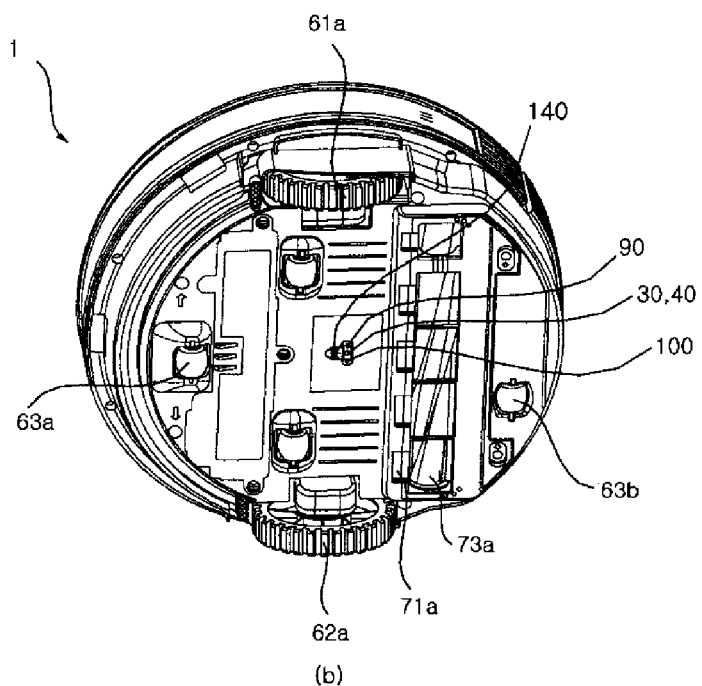

FIG. 2 is a perspective view illustrating a moving robot according to an embodiment of the present invention.

A cleaning or traveling mode is set in accordance with the operation of buttons provided in a moving robot 1 according to the present invention so that the moving robot 1 suctions dust and foreign substances in the vicinity while moving in a pre-determined region to perform cleaning. A battery is mounted in the moving robot 1 so that the moving robot 1 receives an operating power source from the battery. When the current of the battery is insufficient, the battery is returned to a charging table so that the battery is charged. When the battery is charged, set cleaning is re-performed.

Figure 1:
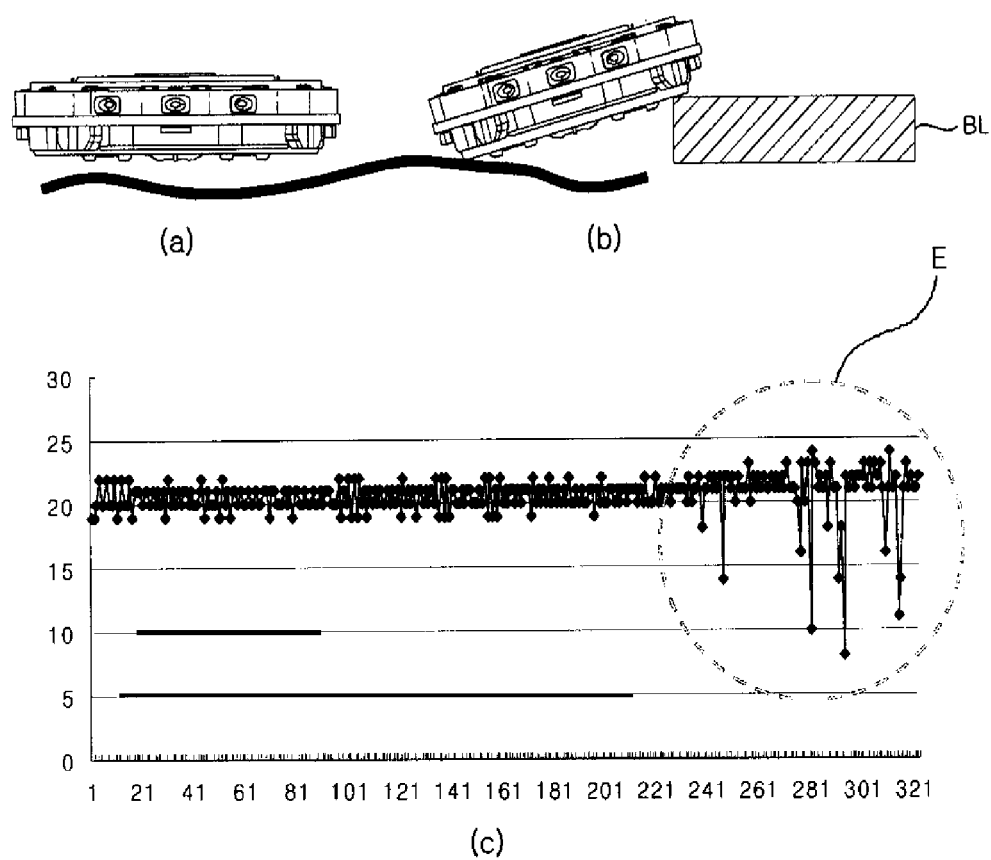
FIG. 1 is a view illustrating a common moving robot.

As illustrated in FIG. 1A, a plurality of buttons in which data can be input are provided in the upper part of the moving robot 1 and a display unit on which information on a current operation state and a set mode is displayed can be provided in the upper part of the moving robot 1. In addition, the moving robot 1 includes a plurality of sensors to travel while avoiding an obstacle.

As illustrated in FIG. 2B, the moving robot 1 includes a plurality of wheels as units for moving in the predetermined region and main wheels 61a and 62a and auxiliary wheels 63a and 63b connected to a motor. In addition, the moving robot 1 includes a dust suctioning unit 71a for suctioning the dust and the foreign substances in the vicinity and on a bottom surface while moving and an agitator 73a.

The moving robot 1 moves by the main wheels 61a and 62a rotating in accordance with the operation of the provided motor. Dust lifted up in the air by the agitator 73a during the movement of the moving robot 1 is suctioned by the dust suctioning unit 71a to clean the bottom surface.

At this time, the moving robot 1 includes a photographing unit for photographing the image of the bottom surface during movement. The photographing unit includes at least one light source units 90 and 100 for radiating light onto the bottom surface and a photographing unit 30 for photographing the bottom surface using the light of the light source reflected to the bottom surface. At this time, the photographing unit 30 includes a lens 32 for collecting light and an image sensor 31 for converting light incident through the lens 32 into an electric signal to photograph an image. In addition, a light amount sensing unit 140 for sensing light radiated from the light source units 90 and 100 is further provided.

The moving robot 1 photographs the image of the bottom surface by the image sensor 31, the lens 32, and the at least one light source units 90 and 100 and compares a previously photographed image with a sequentially photographed image to calculate the moving distance of the moving robot 1 and the position of the moving robot.

At this time, the light source units 90 and 100 and the photographing unit 30 are positioned in a straight line based on the moving direction of the moving robot 1 so that the light source units 90 and 100 radiate light onto the bottom surface photographed by the photographing unit 30. Here, the light source units 90 and 100 and the photographing unit 30 can be provided in the center in a vertical direction based on a shaft for connecting the first main wheel 61a to the second main wheel 61b. However, the position of the light source units 90 and 100 and the photographing unit 30 can change and is not limited to the drawing.

The moving robot 1 photographs the image of the bottom surface photographed by the photographing unit 30 using the light radiated from the light source units 90 and 100, compares images photographed in accordance with time with each other, and analyzes the comparison result to calculate the moving distance and the position of the moving robot 1.

Figure 3:
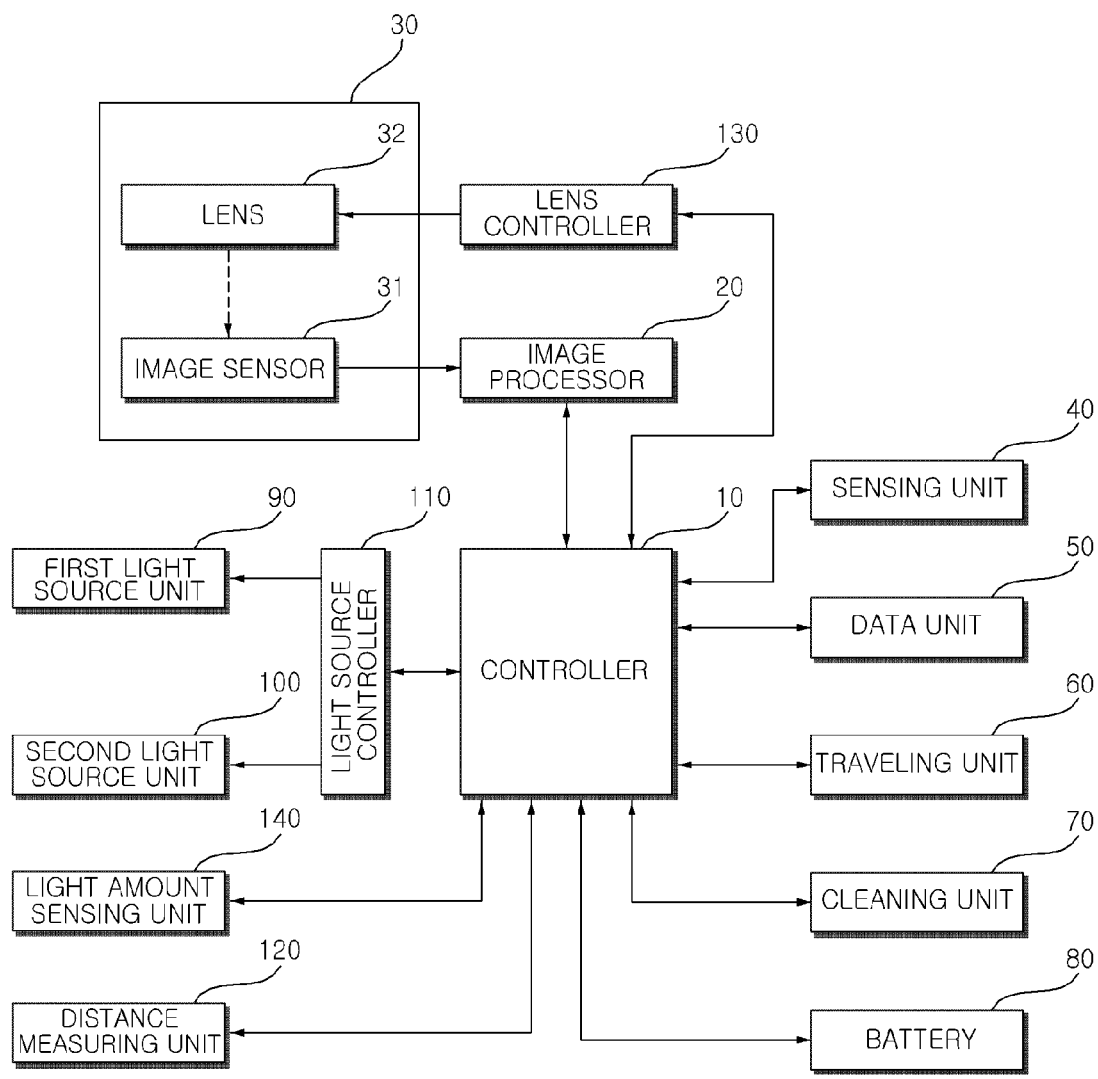
FIG. 3 is a block diagram illustrating the structure of the moving robot according to an embodiment of the present invention.

FIG. 3 is a block diagram illustrating the structure of the moving robot according to an embodiment of the present invention.

Referring to FIG. 3, as described above, the moving robot 1 includes the photographing unit 30 for photographing the image of the bottom surface so that the light collected by the lens 32 included in the photographing unit 30 is input to the image sensor 31 for converting the input light into the electric signal.

The moving robot 1 includes an image processing unit 20 for converting the image signal photographed by the photographing unit 30 and the image sensor 31 into image data in a predetermined form, a sensing unit 40 including a plurality of sensors to sense an obstacle, the light source units 90 and 100 for radiating light onto the bottom surface, a data unit 50 in which data in accordance with the operation control and the operation set of the moving robot 1 are stored, a traveling unit 60 for rotating the plurality of main wheels 61a and 62a so that the moving robot moves, a cleaning unit 70 for suctioning the dust on the bottom surface and in the vicinity to perform cleaning, a battery 80 for supplying the operation power source, and a controller 10 for controlling the moving robot 1 in response to the input data.

In addition, the moving robot 1 further includes a lens controller 130 for controlling the position of the lens 32, a light source controller 110 for controlling the first and second light source units 90 and 100 in response to the control command of the controller 10, a distance measuring unit 120 for measuring a distance to the bottom surface, and a light amount sensing unit 140 for sensing the amount of the light radiated from the first and second light source units 90 and 100.

As described above, the photographing unit 30 includes an image sensor for converting the light into the electric signal to photograph the image of the bottom surface. At this time, the photographing unit 30 is provided on the rear surface of the moving robot 1 so that the image sensor 31 faces the bottom surface to photograph the bottom surface during movement. At this time, the lens 32 is preferably a fan focus type lens having a short focus distance and a large depth but is not limited to the above.

The image processing unit 20 converts an image signal input from the photographing unit 30, that is, the image sensor 31 in the predetermined form to readable image data and applies the generated image data to the controller 10. At this time, the image processing unit 20 converts the image signal input from the image sensor to generate image data of a predetermined type and includes codec for converting the image signal.

The lens controller 130 includes a motor and a moving unit for moving the lens 32 back and forth in accordance with the control command of the controller 10. At this time, the lens controller 130 drives the motor to perform control so that the lens 32 moves back and forth. Here, the lens 32 moves back and forth by the lens controller 130 so that the focus distance of the photographing unit 30 varies.

The light source units 90 and 100 radiate light of a predetermined amount onto the bottom surface to provide light required for the photographing unit 30 to photograph the image of the bottom surface. At this time, the light radiated from the light source units 90 and 100 is incident on the photographing unit 30 so that the bottom surface can be photographed.

At least two light source units 90 and 100 are preferably provided and a third or fourth light source unit can be further provided. According to the present invention, the first light source unit 90 and the second light source unit 100 are provided.

The first light source unit 90 adjacent to the image sensor 31 radiates light onto the bottom surface photographed by the image sensor 31. The second light source unit 100 adjacent to the image sensor 31 like the first light source unit 90 radiates light onto the bottom surface photographed by the image sensor 31. At this time, the first light source unit 90 and the second light source unit 100 radiate light onto the same region and can be provided from side to side and up and down based on the image sensor 31. In addition, the first light source unit 90 and the second light source unit 100 can be provided in the same direction based on the image sensor 31 and are preferably provided on the photographing unit 30 to be in a straight line with the photographing unit 30 based on the moving direction of the moving robot 1.

The light radiated from the first light source unit 90 and the second light source unit 100 is reflected to the bottom surface, is collected by the lens 32, and is input to the image sensor 31. The image sensor 31 receives the light radiated from the first and second light source units 90 and 100 to be reflected to the bottom surface and photographs the bottom surface.

Here, the first light source unit 90 and the second light source unit 100 are connected to the light source controller 110 and are controlled by the light source controller 110 in accordance with the control command of the controller 10 so that the amount of the radiated light varies.

When the light radiated from the light source units 90 and 100 to be reflected to the bottom surface is incident, the light amount sensing unit 140 measures the amount of the incident light to sense the amount of the light and applies data on the amount of the sensed light to the controller 10. At this time, the light amount sensing unit 140 is provided on one side to be adjacent to the photographing unit 30.

The light source controller 110 controls the magnitude of current or voltage applied to the first light source unit 90 and the second light source unit 100 in response to the control command of the controller 10 or performs control so that a resistance value varies to control the amount of the light of the first light source unit 90 and the second light source unit 100. In addition, the light source controller 110 performs control so that the first light source unit 90 and the second light source unit 100 operate to emit light or that one of the first light source unit 90 and the second light source unit 100 stops operating not to emit light. In addition, the light source controller 110 controls the light radiation angle of the first light source unit 90 and the second light source unit 100 in response to the control command of the controller 10. The light source controller 110 controls a predetermined controller provided in a housing for supporting the first light source unit 90 and the second light source unit 100 to control the light radiation angle.

Here, as described above, the light source controller 110 controls the light amount, the light emission, and the light radiation angle of the first and second light source units 90 and 100, however, is not limited to the above. For example, the light source controller 110 can vary the color of the light emitted from the light source units 90 and 100 or the temperature of the color and can control the operation of a device for emitting light.

The battery 80 supplies the operation power source required for the moving robot to move and to perform cleaning and receives charging current from a charging table to charge the battery when the current of the battery is insufficient. The battery 80 is connected to a battery sensing unit so that the amount of the current of the battery and the charge state of the battery are applied to the controller 10.

The data unit 50 stores data on the operation control and the operation set of the moving robot 1 and control data on functions performed by the moving robot 1. In addition, the data unit 50 can temporarily store the image signal photographed by the photographing unit 30 and provides a storage space for converting the image signal of the image processing unit 20.

The traveling unit 60 rotates the at least main wheels 61a and 62a to move the moving robot 1. At this time, the traveling unit 60 further includes a predetermined wheel motor connected to the main wheels 61a and 62a to rotate the main wheels 61a and 62a. The wheel motor is driven in accordance with the control command of the controller 10 so that the moving robot 1 moves in a predetermined region.

The cleaning unit 70 suctions the dust and foreign substances in the vicinity that are generated during the traveling performed by the traveling unit 60. At this time, the cleaning unit 70 includes a dust suctioning unit 71a and the agitator 73a and the pre-determined suctioning motor for suctioning the air and a unit for condensing the dust are provided in the dust suctioning unit 71a to suction the dust and foreign substances.

In addition, the controller 10 controls the traveling unit 60 to sense an obstacle in response to signals input from the plurality of sensors provided in the sensing unit 40 and to change a traveling direction, controls the cleaning unit 70 in accordance with an input set, and controls the suctioning force of the dust suctioning unit 71a and the rotation of the agitator 73a. In addition, while the moving robot 1 travels, the controller 10 performs control so that the light source units 90 and 100 are driven and that the image of the bottom surface can be photographed by the photographing unit 30.

In addition, while the moving robot 1 travels, the controller 10 compares the data input from the image sensor 31 at predetermined time intervals with each other to analyze the comparison result and calculates the moving distance and the moving direction of the moving robot 1 to calculate the position of the moving robot 1. At this time, the controller 10 compares the data input from the image sensor 31 in units of pixels to calculate the moving distance. When the data are not input for no less than a predetermined time or when noise no less than a predetermined magnitude is included in the input data, the controller 10 determines that errors are generated in the input data. When the data input from the image sensor 31 cannot be compared with previous data, that is, when no correlation or no comparable pixels exist in the image data, in addition, when a plurality of noises no less than a predetermined magnitude are included, the controller 10 determines that the errors are generated in the input data.

When the errors are generated in the data input from the image sensor 31 as described above, the controller 10 calculates the distance to the bottom surface by the distance measuring unit 120 to control the light source controller 110 and the lens controller 130. Here, the distance measuring unit 120 transmits ultraviolet (UV) rays or supersonic waves to calculate the distance in accordance with the time for which a signal is reflected to return.

The controller 10 performs control so that at least one of the light amount and the light radiation angle of the first and second light source units 90 and 100 vary by the light source controller 110 in response to the distance measured by the distance measuring unit 120 and applies the control command to the lens controller 130 so that the lens 32 moves back and forth and that the focus distance of the photographing unit 30 varies.

At this time, the controller 10 controls the light source units 90 and 100 so that the light of the predetermined amount is radiated onto the bottom surface and that the photographing unit 30 can photograph the image of the bottom surface. At this time, the controller 10 controls the light source units 90 and 100 by the light source controller 110 based on the light amount data input from the light source sensing unit 140. At this time, the controller 10 applies the control command to the light source controller 110 so that the magnitude of current or voltage applied to the light source units 90 and 100 varies and that the resistance value varies to control the degree of light emission of the light source units 90 and 100.

Figure 4:
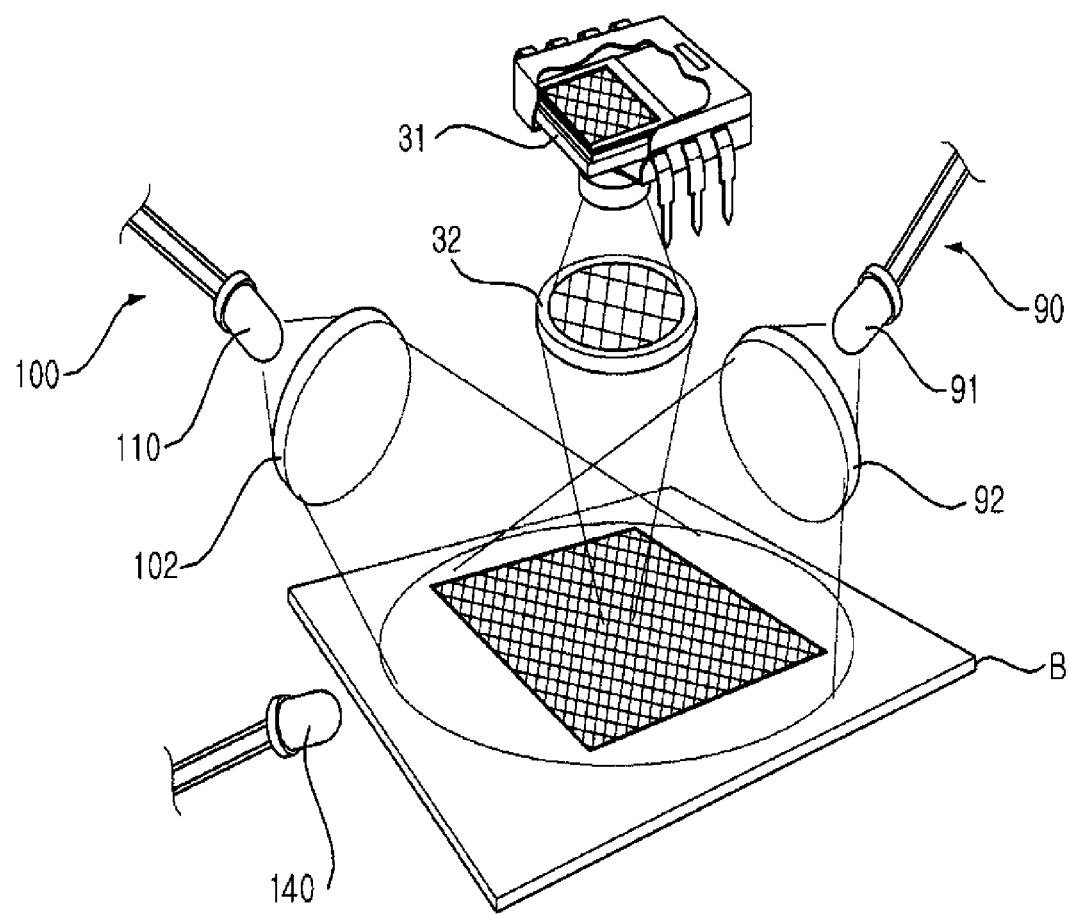
FIG. 4 is a view illustrating the structures of the photographing unit and the light source of the moving robot according to an embodiment of the present invention.

FIG. 4 is a view illustrating the structures of the photographing unit and the light source of the moving robot according to an embodiment of the present invention.

As illustrated in FIG. 4, the photographing unit 30 including the lens 32 and the image sensor 31 are provided on the rear surface of the moving robot 1 to face the bottom surface so that the moving robot 1 photographs the image of the bottom surface. In addition, the first light source unit 90 and the second light source unit 100 adjacent to the image sensor 31 to radiate light are provided on the rear surface of the moving robot 1. As described above, the first and second light sources 90 and 100 radiate light onto the same region of the bottom surface photographed by the image sensor 31.

At this time, the light radiated from the first light source unit 90 and the second light source unit 100 is incident on the light amount sensing unit 140 so that the light amount sensing unit 140 senses the amount of the light incident on the photographing unit 30.

The first light source unit 90 includes a light emitting device 91 for radiating light and a light width controller 92 for controlling a range in which the light reaches so that the light radiated from the light emitting device 91 is not diffused. The second light source unit 100 includes a light emitting device 101 and a light width controller 102 like the first light source unit 90. At this time, a light emitting diode (LED) is preferably used as the light emitting device. However, the light emitting device is not limited to the LED but any light emitting device that can control the amount of light can be used.

In addition, the light width controller 112 is preferably formed of a material that does not transmit light but reflects light and can be a cone or a quadrangular pyramid. At this time, the light width controller 112 can further include a controller for controlling a surface area and the controller can be controlled by the controller 10. For example, the controller 10 controls the controller so that the surface area of the light width controller 112 is increased or reduced to control the size of the range in which the light reaches, that is, the size of the region onto which the light is radiated and the amount of the light radiated onto the region.

The light amount sensing unit 140 adjacent to the photographing unit 30 senses the amount of the light radiated from the light source units 90 and 100. At this time, the light amount sensing unit 140 includes at least one unit for sensing the light such as a light receiving sensor and a light amount sensor.

At this time, since the light amount sensing unit 140 is adjacent to the photographing unit 30 so that light of a similar degree to the amount of the light incident on the photographing unit 30 is incident, the light amount sensing unit 140 senses the amount of the light incident on the photographing unit 30.

Figure 5:
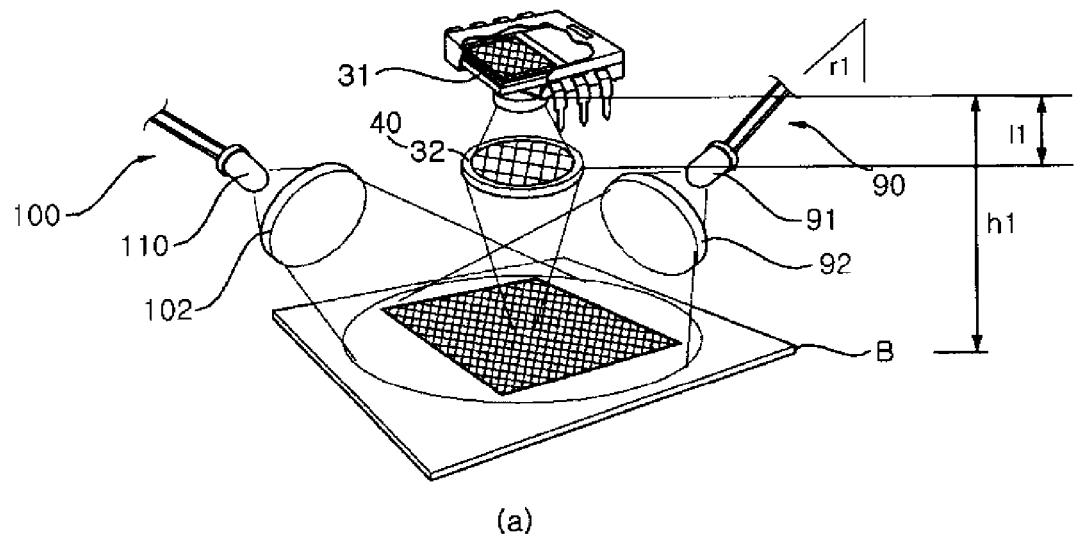
FIG. 5 is a view illustrating an example of controlling the photographing unit and the light source of the moving robot according to an embodiment of the present invention.
Figure 5:
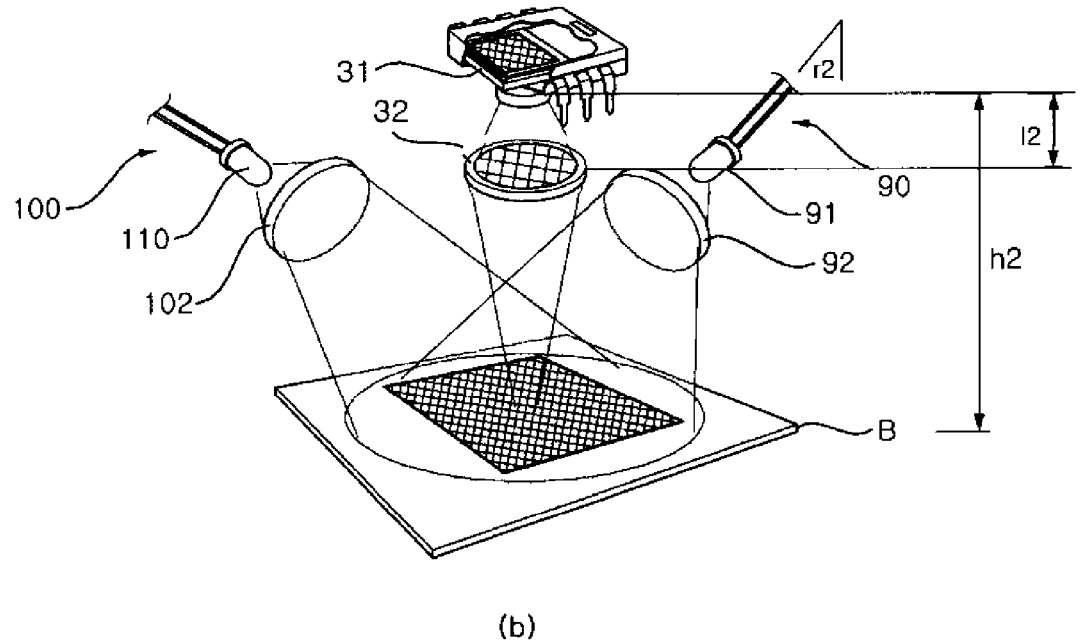

FIG. 5 is a view illustrating an example of controlling the photographing unit and the light source of the moving robot according to an embodiment of the present invention. Since FIG. 5 relates to controlling the amount of light and the radiation angle of light when errors are generated in the image data, the light amount sensing unit 140 is omitted from the drawing.

As illustrated in FIG. 5, the light source unit 90 and the second light source unit 100 control the amount of light by the light source controller 110 in accordance with the control command of the controller 10 and vary the radiation angle of light.

Here, when the moving robot 1 moves the uneven bottom surface, since the light of the first and second light source units 90 and 100 does not reach the image sensor 31 so that errors can be generated in calculating the position of the moving robot 1 by sensing the image, the controller 10 controls the amount of the light of the first and second light source units 90 and 100 by the light source controller 110. In addition, since the amount of the light incident on the image sensor 31 can vary in accordance with the brightness of a place in which the moving robot 1 is positioned and the state of the bottom, the amount of the light of the first and second light source units 90 and 100.

In addition, when the moving robot 1 is separated from the bottom surface by a uniform distance due to the unevenness of the bottom surface or the obstacle, since the light radiated from the first and second light source units 90 and 100 is not input to the image sensor 31, the radiation angle of the light is controlled.

As illustrated in FIG. 5A, when the moving robot 1 moves on the flat bottom surface, the image sensor 31 is separated from the bottom surface by a uniform distance. At this time, the first and second light source units 90 and 100 radiate the light onto the bottom surface photographed by the image sensor 31 at a reference angle r1 based on a previously set basic distance h1.

On the other hand, when the moving robot 1 is separated from the bottom surface by no less than the basic distance h1, since errors are generated in the input data as illustrated in FIG. 1C, the controller 10 measures a distance h2 to the bottom surface by the distance measuring unit 120 to control at least one of the light source controller 110 and the lens controller 130. At this time, the controller 10 calculates the radiation angle of the light based on the measured distance h2 to the bottom surface to apply the calculated radiation angle of light to the light source controller 110 and to apply the control command to the lens controller 130 so that the lens 32 moves back and forth in accordance with the distance h2. The controller 10 controls the lens controller 130 when errors are generated in the image sensor 31 photographing and sensing the image after applying the control command to the light source controller 110.

As illustrated in FIG. 5B, the radiation angle of the light of the first and second light source units 90 and 100 changes to the radiation angle r2 and the position of the lens 32 changes from a basic position 11 to a changed position 12. Therefore, the light radiated from the first and second light source units 90 and 100 is input to the image sensor 31 so that the moving distance and the moving direction of the moving robot 1 are operated based on the image data and that the position of the moving robot 1 is calculated.

Figure 6:
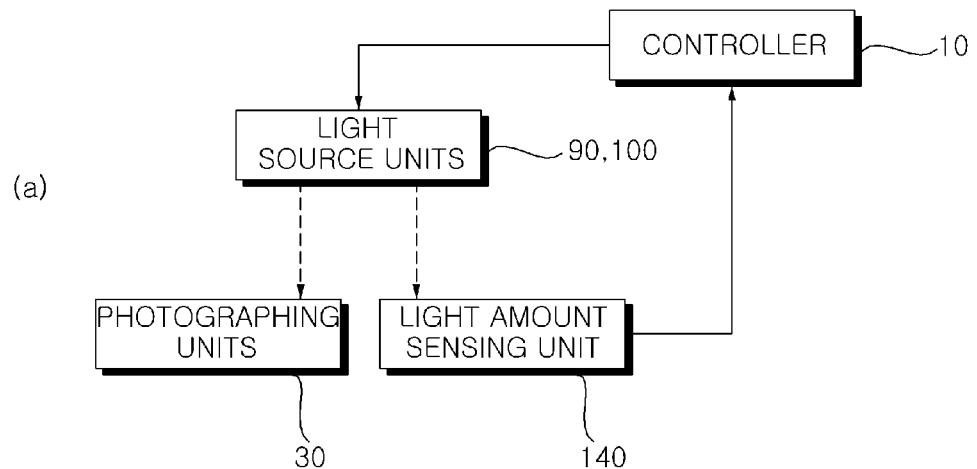
FIG. 6 is a block diagram illustrating the structure of controlling the light amount feedback of the moving robot of the moving robot according to an embodiment of the present invention.
Figure 6:
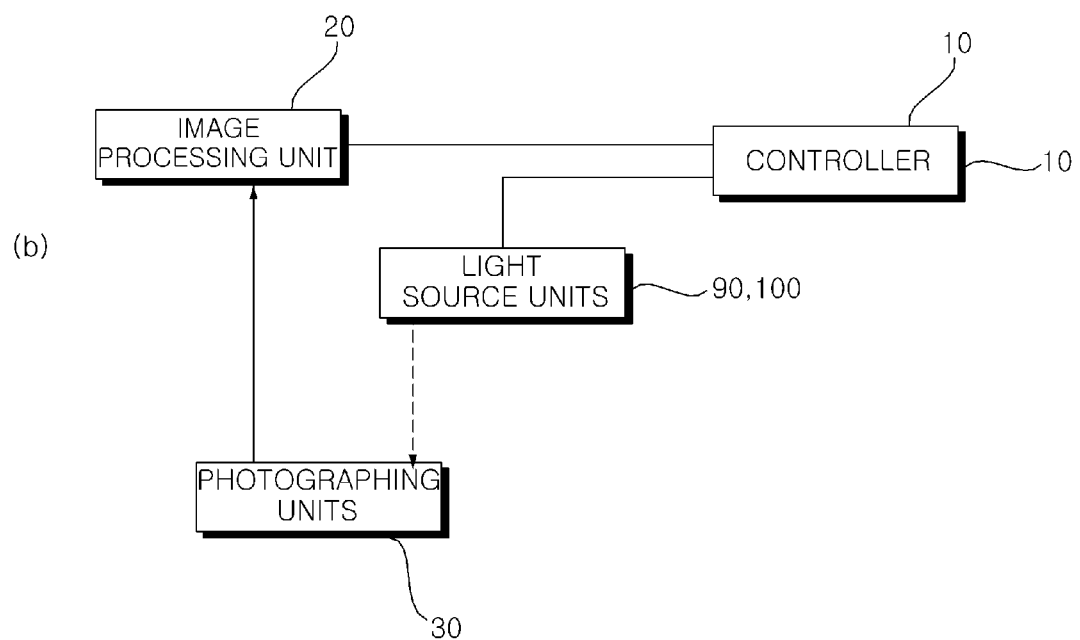

FIG. 6 is a block diagram illustrating the structure of controlling the light amount feedback of the moving robot of the moving robot according to an embodiment of the present invention.

As illustrated in FIG. 4, the light source units 90 and 100 are connected to the controller 10 to radiate light of a predetermined amount onto the bottom surface B in accordance with the control of the controller 10. At this time, the light radiated by the light source units 90 and 100 is reflected to the bottom surface B to be incident on the photographing unit 30 and the light amount sensing unit 140. The photographing unit 30 converts the incident light into the electric signal by the image sensor 31 to photograph the bottom surface. On the other hand, the light amount sensing unit 140 measures the intensity and the exposure value of the incident light to sense the light amount and applies the sensed light amount data to the controller 10.

At this time, in FIGS. 4 and 5, the controller 10 controls the light amount of the light source units 90 and 100 in accordance with the result of the sensing of the light amount sensing unit 140 as well as the light amount of the light source units 90 and 100 in accordance with the errors in sensing the image data.

As illustrated in FIG. 6A, the controller 10 receives data on the amount of light sensed by the light amount sensing unit 140 to control the light source units 90 and 100 by the light source controller 110. At this time, the controller 10 compares the light amount data of the light amount sensing unit 140 with a predetermined reference value and analyzes the comparison result to reduce the amount of the light of the light source units 90 and 100 when it is determined that the light amount is excessive and to increase the amount of the light of the light source units 90 and 100 when it is determined that the light amount is insufficient. Therefore, the light emission amount of the light source units 90 and 100 is reduced in a bright place and is increased in a dark place so that the image photographed by the photographing unit 30 maintains brightness of a uniform level.

At this time, the controller 10, the light amount sensing unit 140, and the light source units 90 and 100 constitute a feedback circuit in which the light source units 90 and 100 radiate light by the light source controller 110 in accordance with the control of the controller 10, the light amount sensing unit 140 senses the amount of the light radiated from the light source units 90 and 100, and the controller 10 controls the light source units 90 and 100 by the light source controller 110 in accordance with the sensing result of the light amount sensing unit 140.

On the other hand, as illustrated in FIG. 6B, the controller 10 can control the light source units 90 and 100 using the exposure value, that is, the light amount value calculated by the image processing unit 20.

When the photographing unit 30 photographs the image of the bottom surface using the incident light, the image processing unit 20 calculates the exposure value, that is, the light amount value of each frame to calculate a frame rate in a process of the photographing unit 30 converting the photographed image signal into the readable image data. When the additional light amount sensing unit 140 is not provided, the controller 10 controls the light emission degree of the light source units 90 and 100 using the light amount value calculated by the image processing unit 20.

At this time, the controller 10, the light source units 90 and 100, and the image processing unit 20 constitute a feedback circuit in which, when the light source units 90 and 100 are controlled by the controller 10 and the light of the light source units 90 and 100 is photographed by the photographing unit 30, the image processing unit 20 senses the light amount through the photographed image to apply the sensed light amount to the controller 10 and the controller 10 controls the light emission amount of the light source units 90 and 100.

That is, the light amount is sensed by the light amount sensing unit 140 to be applied to the controller 10 as illustrated in FIG. 6A and is calculated by the image processing unit 20 to be applied to the controller 10 as illustrated in FIG. 6B, which is not limited to the detailed description and the drawings of the present invention. Any unit that can measure or operate the light amount and the exposure value can be applied.

Figure 7:
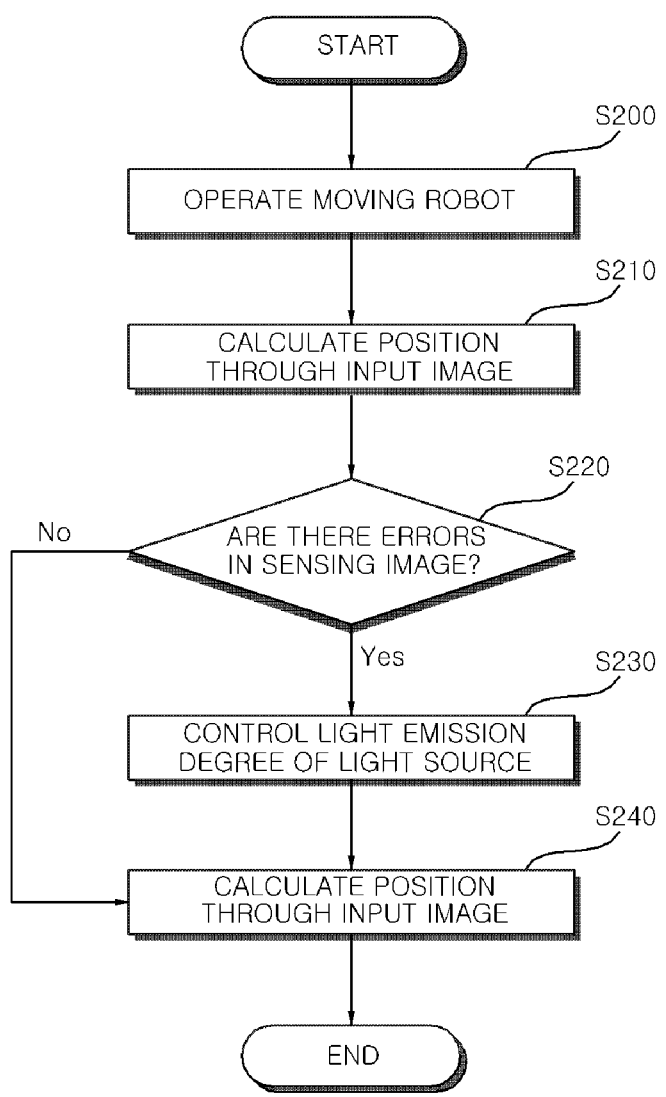
FIG. 7 is a flowchart illustrating a method of sensing the position of the moving robot according to an embodiment of the present invention.

The operation of the moving robot according to an embodiment of the present invention having the above structure will be described as follows. FIG. 7 is a flowchart illustrating a method of sensing the position of the moving robot according to an embodiment of the present invention.

As illustrated in FIG. 7, the cleaning mode of the moving robot 1 is set in accordance with the input data so that the moving robot 1 suctions dust and foreign substances to perform cleaning while moving in a predetermined region (S200).

The controller 10 of the moving robot 1 drives the image sensor 31 during the movement so that the image sensor 31 photographs the image of the bottom surface and that the input data are compared with each other at predetermined time intervals to operate the moving distance and the moving direction of the moving robot 1 and to calculate the position of the moving robot 1 (S210).

At this time, the controller 10 drives the image sensor 31 and operates the first and second light source units 90 and 100 by the light source controller 110 so that light of predetermined brightness is radiated onto the bottom surface. The light radiated from the first and second light source units 90 and 100 onto the bottom surface is reflected to be input to the image sensor 31 so that the image sensor 31 photographs the image of the bottom surface. The signal of the image photographed by the image sensor 31 is input to the image processing unit 20 to be converted so that the image data in a predetermined form are generated.

The controller 10 compares the data input from the image sensor 31 with each other at predetermined time intervals to operate the moving distance or the moving direction of the moving robot 1. When the image data cannot be compared with each other or cannot be analyzed due to a large amount of noise, it is determined that errors are generated in the data (S220).

That is, when errors are generated in the data input by the image sensor 31 so that it is difficult to calculate the moving distance of the moving robot 1 and to sense the position of the moving robot 1 through the image, the controller 10 controls the light amount of the first and second light source units 90 and 100. The light source controller 120 varies the magnitude of the current or the resistance applied to the first and second light source units 90 and 100 in accordance with the control command of the controller 10 to control the light amount (S230). For example, the controller 10 calculates the exposure degree of the data to increase the light amount when noise is generated due to an insufficient amount of light and to reduce the light amount when the light amount is excessive so that it is difficult to distinguish the image data from each other.

The controller 10 receives new data photographed by the image sensor 31 to operate the moving distance and the moving direction of the moving robot 1 and to re-calculate the position of the moving robot 1 (S240).

When the image data are normally input, the controller 10 compares the previously input data with the new input data in units of pixels and analyzes the comparison result to calculate the moving distance and the moving direction of the moving robot 1 based on the pixels of the same images and to calculate the position of the moving robot 1.

Figure 8:
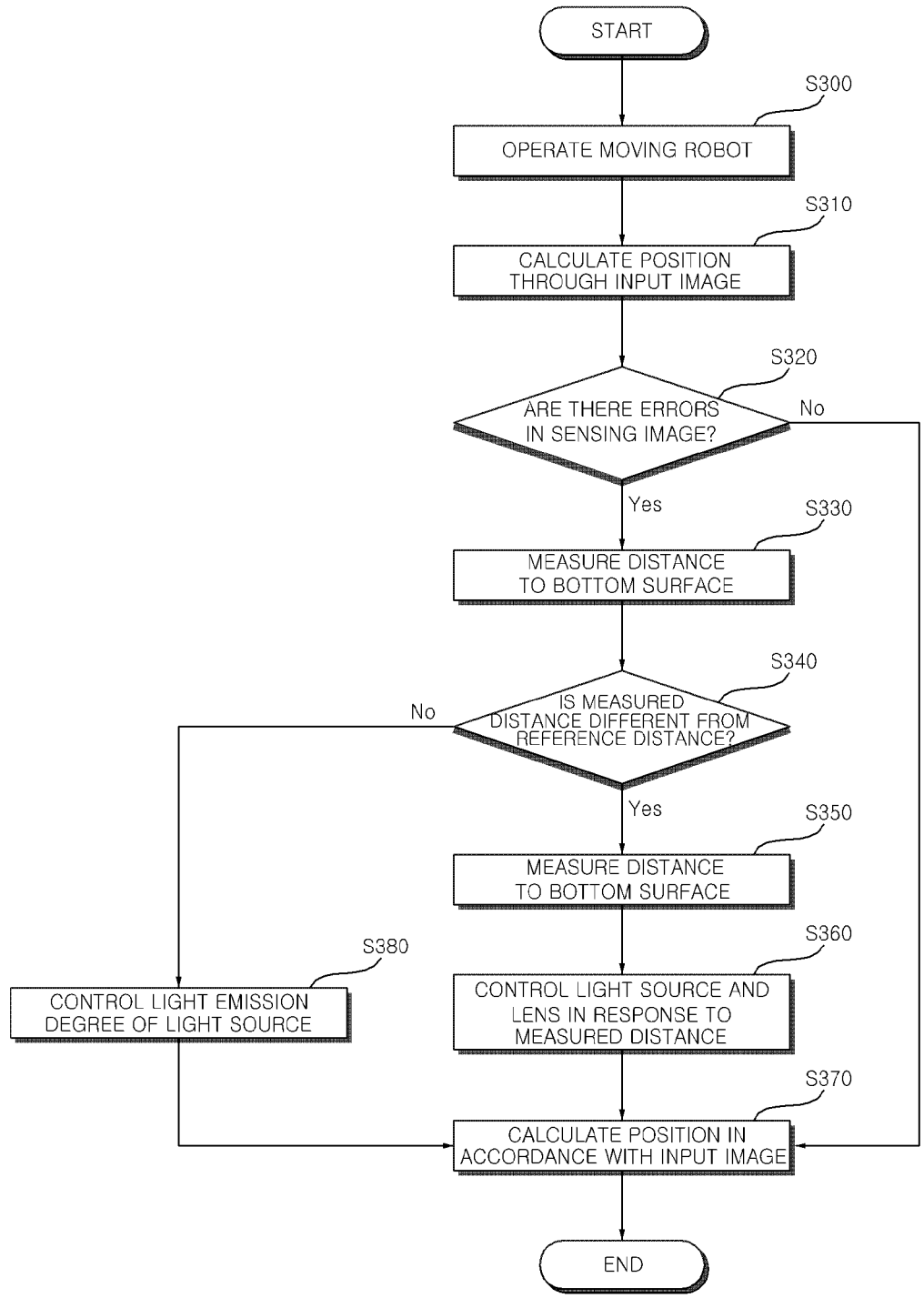
FIG. 8 is a flowchart illustrating a method of controlling the light source of the moving robot according to an embodiment of the present invention to sense the position of the moving robot.

FIG. 8 is a flowchart illustrating a method of controlling the light source of the moving robot according to an embodiment of the present invention to sense the position of the moving robot.

As illustrated in FIG. 8, the moving robot 1 performs cleaning while moving in a pre-determined region in accordance with set (S300). The moving robot 1 receives the data input through the image sensor 31 at predetermined time intervals and compares the input data with each other to analyze the comparison result and to calculate the moving distance and the moving direction. At this time, when the input data cannot be compared with each other and cannot be analyzed, the controller 10 determines that errors are generated in the input data so that errors are generated in sensing the position of the moving robot 1 through the image (S320).

The controller 10 drives the distance measuring unit 120 to measure the distance from the corresponding position to the bottom surface (S330). The controller 10 compares the measured distance data with the previously set reference distance to determine whether the measured distance data are the same as the previously set reference distance (S340).

When the measured distance is different from the reference distance, the controller 10 determines that the moving robot 1 is separated from the bottom surface by no less than a uniform distance and that the image of the bottom surface cannot be photographed to control the light source controller 110 so that the light radiation angle of the first and second light source units 90 and 100 varies in accordance with the measured distance. At this time, the controller 10 calculates the measured distance and a radiation angle to be changed based on the currently set radiation angle to apply the control command to the light source controller 110 and the light source controller 110 controls the light radiation angle of the first and second light source units 90 and 100 in accordance with the control command.

In addition, the controller 10 determines whether the image is normal by the image sensor 31 after the light source controller 110 varying the light radiation angle and, when it is determined that there are errors, re-calculates the position of the lens 32 in accordance with the measured distance and applies the control command to the lens controller 130 so that a distance between the lens 32 and the image sensor 31 varies (S350).

The controller 10 receives the new data input through the image sensor 31 to calculate the moving distance and the moving direction and to re-calculate the position (S360).

On the other hand, when the measured distance is identical with the reference distance, the controller 10 performs control so that the light amount of the first light source unit 90 and the second light source unit 100 is increased or reduced (S370) and re-calculates the position in accordance with the newly photographed image data (S370).

Figure 9:
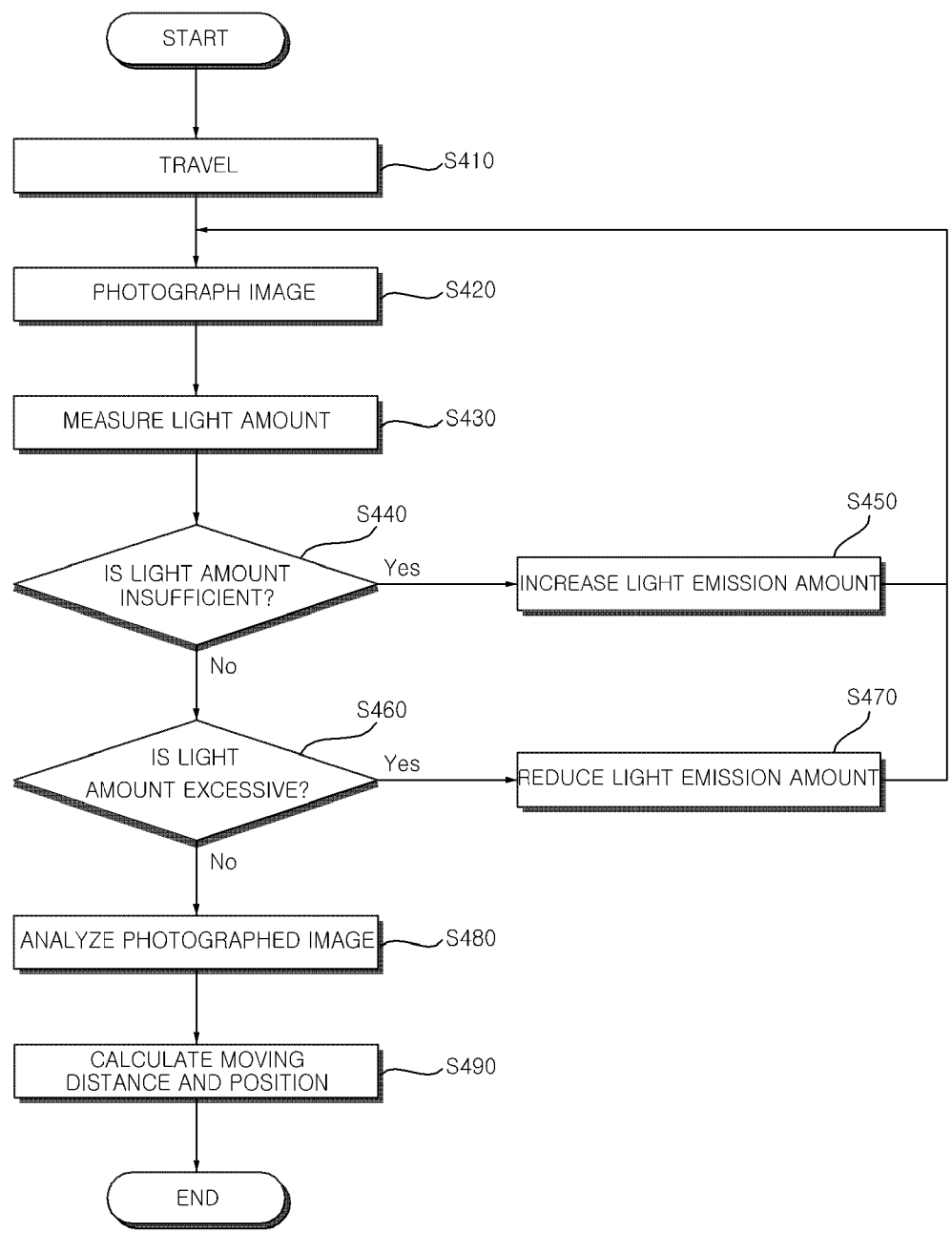
FIG. 9 is a flowchart illustrating a method of controlling the light amount of the moving robot according to an embodiment of the present invention.

FIG. 9 is a flowchart illustrating a method of controlling the light amount of the moving robot according to an embodiment of the present invention.

FIG. 9 is a flowchart illustrating a method of sensing the position of the moving robot according to an embodiment of the present invention.

As illustrated in FIG. 9, when a cleaning mode is set in accordance with the input data, the moving robot 1 starts to travel and suctions dust and foreign substances while moving in a predetermined region to perform cleaning (S410).

The controller 10 of the moving robot 1 controls the light source units 90 and 100 during the movement so that the light is radiated onto the bottom surface and drives the photographing unit 30 so that the image of the bottom surface is photographed by the photographing unit 30 (S420). At this time, the photographing unit 30 photographs the bottom surface using the light radiated from the light source units 90 and 100, reflected to the bottom surface, and incident on the photographing unit 30.

At this time, when the light radiated from the light source units 90 and 100 is incident, the light amount sensing unit 140 measures the brightness of the incident light to sense the light amount (S430). The light amount sensing unit 140 including the light receiving sensor or the light amount sensor measures the intensity or the exposure of the light to sense the light amount and applies the light amount data to the controller 10.

The controller 10 analyzes the light amount data applied from the light amount sensing unit 140 to determine whether the light amount is excessive or insufficient. At this time, the controller 10 compares the light amount with a predetermined reference value to determine whether the light amount is excessive or insufficient. Here, the minimum reference value and the maximum reference value are preferably set in a range where the image can be distinguished and can vary.

The controller 10 compares the light amount data and the minimum reference value and the maximum reference value with each other to determine that the light amount is insufficient when the light amount data are less than the minimum reference value, to determine that the light amount is excessive when the light amount data are larger than the maximum reference value, and to determine that the light amount is proper when the light amount data are no less than the minimum reference value and no more than the minimum reference value.

When it is determined that the light amount is insufficient (S440), the controller 10 controls the light source units 90 and 100 to increase the light emission amount (S450). When it is determined that the light amount is excessive (S460), the controller 10 controls the light source units 90 and 100 to reduce the light emission amount (S470). At this time, the controller 10 controls the magnitude of the current, the voltage, or the resistance applied to the light source units 90 and 100 to control the light emission amount of the light source units 90 and 100.

As described above, the controller 10 controls the light source units 90 and 100 and senses the light emission degree of the light source units 90 and 100 through the light amount sensing unit 140 to feedback control the light emission amount.

At this time, the image signal of the bottom surface photographed by the photographing unit 30 is converted into the readable image data by the image processing unit 20 and the controller 10 analyzes the input image data (S480) to calculate the moving distance of the moving robot 1 and the position of the moving robot (S490).

The controller 10 compares the input image data with each other in units of pixels in the time order to calculate the moving distance and the moving direction in accordance with the degree of movement of the pixels based on the pixels of the same images and to calculate the position of the moving robot 1.

Although embodiments of the present invention have been described with reference to drawings, these are merely illustrative, and those skilled in the art will understand that various modifications and equivalent other embodiments of the present invention are possible. Consequently, the true technical protective scope of the present invention must be determined based on the technical spirit of the appended claims.

INDUSTRIAL APPLICABILITY

According to the present invention, in the moving robot and the method of operating the same, the photographed data are compared with each other and analyzed to calculate the moving distance or the position of the moving robot. When errors are generated in the photographed data, the amount of light or the radiation angle of light is variably controlled and the amount of the light radiated for photographing is sensed to control the degree of light emission so that the amount of the light emission is reduced in a bright place and that the amount of the light emission is increased in a dark place. Therefore, since brightness of a proper amount for photographing the image can be maintained and the quality of the image obtained by photographing the bottom surface is maintained in a uniform level, the image is easily sensed to prevent noise from being generated due to the insufficient amount of light and to prevent errors from being generated in calculating the position of the moving robot due to errors in sensing the image. As a result, the correctness of calculating the moving distance and the position of the moving robot is improved.

The invention claimed is:

1. A moving robot configured to move along a support surface, the moving robot comprising:
    a photographing unit provided on a bottom surface of the moving robot for photographing sequential images of the support surface using incident light;
    at least one light source unit provided on the moving robot for radiating light onto a corresponding region of the support surface to be photographed by the photographing unit;
    a controller configured to compare the sequential images captured by the photographing unit and to control the at least one light source unit based on a result of the comparison; and
    a light source controller coupled to the at least one light source unit and configured to control a magnitude of current or voltage input from the at least one light source unit, and to control a radiation angle of light radiated from the at least one light source unit in response to a control command generated by the controller.

2. The moving robot of claim 1, wherein the controller is configured to receive data from the photographing unit in units of pixels at predetermined time intervals, and to compare the received data to calculate a moving distance of the moving robot, and wherein the controller is further configured to adjust at least one setting of the at least one light source unit when the calculated moving distance is different from a reference distance.

3. The moving robot of claim 1, wherein the light source controller controls an amount of light emitted by the at least one light source unit in response to the control command of the controller.

4. The moving robot of claim 3, further comprising:
    a distance measuring unit for measuring a distance to the support surface, wherein the light source controller controls the amount of light or the light radiation angle of the at least one light source unit based on the distance measured by the distance measuring unit.

5. The moving robot of claim 4, further comprising a lens controller for moving a lens included in the photographing unit back and forth, wherein the controller controls the lens controller to control a focus distance of the photographing unit based on the distance measured by the distance measuring unit.

6. The moving robot of claim 1, wherein the at least one light source unit comprises:
    a first light source including a light emitting device to radiate light onto a corresponding region of the support surface to be photographed by the photographing unit; and
    a second light source for radiating light onto the same region of the support surface as the first light source unit.

7. The moving robot of claim 6, wherein the at least one light source unit further comprises a light width controller for controlling a range in which light is emitted so that the emitted light reaches a predetermined region and is not diffused.

8. A method of operating a moving robot, the method comprising:
    comparing image data captured by a photographing unit, provided on a bottom surface of the moving robot, over time and calculating a corresponding moving distance of the moving robot along a support surface;
    controlling a light source for radiating light onto the support surface, comprising adjusting at least one setting of the light source when the image data captured by the photographing unit is unreadable and the corresponding moving distance along the support surface cannot be calculated, and then re-capturing the image data, wherein re-capturing the image data comprises:
    measuring a distance to the support surface;
    comparing the measured distance to a reference distance; and
    controlling a radiation angle of light emitted by the light source when the measured distance is greater than the reference distance; and
    comparing the image data re-captured by the photographing unit to calculate the moving distance.

9. The method of claim 8, wherein controlling a light source for radiating light onto the support surface further comprises:
    increasing an amount of light radiated by the light source when the measured distance is larger than the reference distance.

10. The method of claim 9, further comprising moving a lens provided on a front surface of the photographing unit back and forth based on the measured distance to control a focus distance.

* * * * *